(No Model.) 7 Sheets—Sheet 1.

A. O. SLENTZ.
HARVESTER.

No. 441,038. Patented Nov. 18, 1890.

WITNESSES:
Harry Frease
Chas. R. Miller

INVENTOR
Almetree O. Slentz
BY
W. K. Miller
ATTORNEY (No Model.) 7 Sheets—S

A. O. SLENTZ.
HARVESTER.

No. 441,038. Patented Nov. 18,

WITNESSES:
Harry Frease
Chas. R. Miller

Albertice O. Slentz INVENTOR

BY
W. K. Miller
ATTORNEY (No Model.) 7 Sheets—Sheet 3.

A. O. SLENTZ.
HARVESTER.

No. 441,038. Patented Nov. 18, 1890.

WITNESSES: Harry Frease, Chas. R. Miller

INVENTOR Albustus O Slentz BY W. K. Miller ATTORNEY (No Model.) 7 Sheets—Sheet 4.
A. O. SLENTZ.
HARVESTER.
No. 441,038. Patented Nov. 18, 1890.
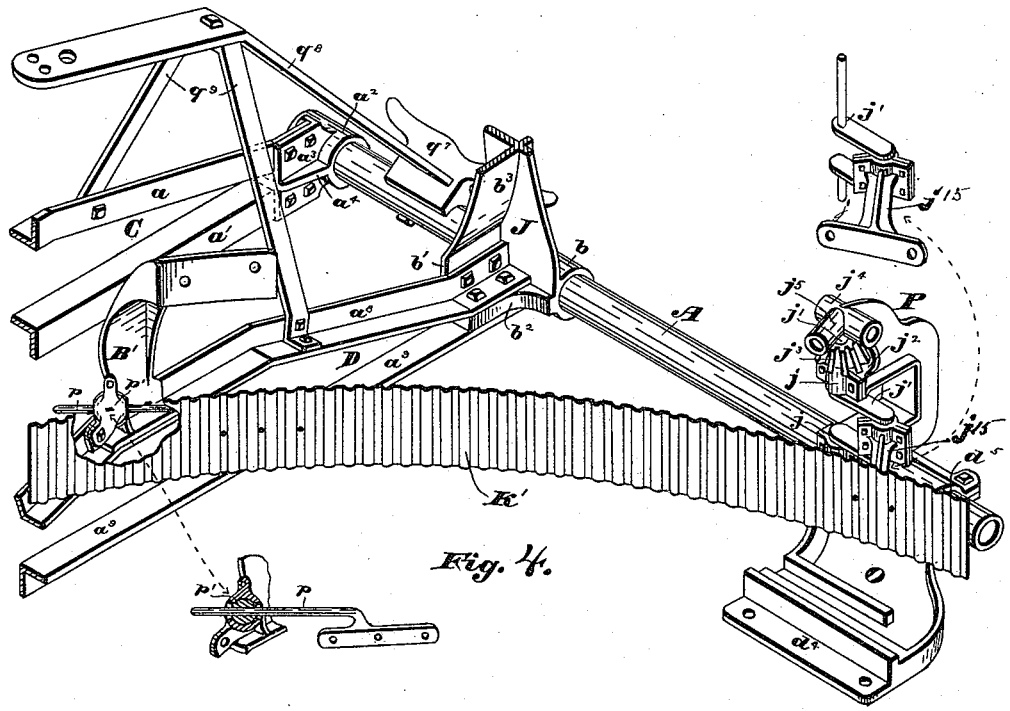
Fig. 4.
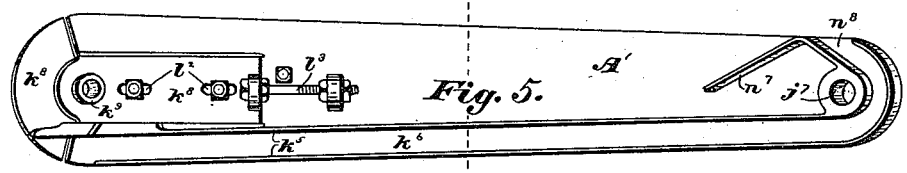
Fig. 5.
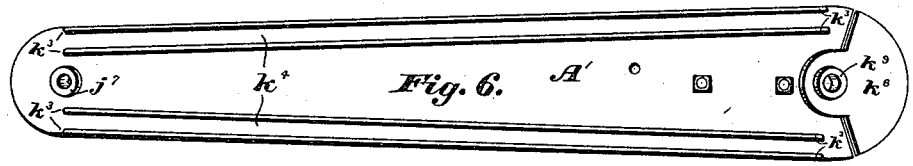
Fig. 6.
Fig. 7.
WITNESSES:
Harry Frease
Chas. P. Miller
INVENTOR
Albertice O. Slentz
BY
W. K. Miller
ATTORNEY (No Model.) 7 Sheets—Sheet 5.
A. O. SLENTZ.
HARVESTER.

No. 441,038. Patented Nov. 18, 1890.

WITNESSES: Harry Frease Chas. R. Miller

INVENTOR Alburtice O. Slentz

BY W. K. Miller ATTORNEY (No Model.) 7 Sheets—Sheet 6.
A. O. SLENTZ.
HARVESTER.
No. 441,038. Patented Nov. 18, 1890.
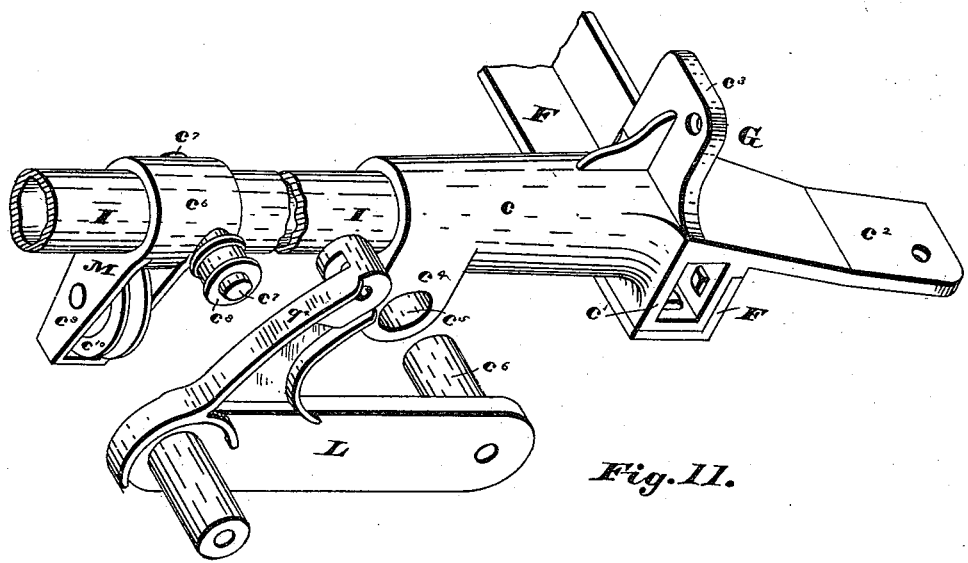
Fig. II.
WITNESSES: INVENTOR
Harry Frease. Albertus O Slentz
Chas. R. Miller BY
W K Miller ATTORNEY

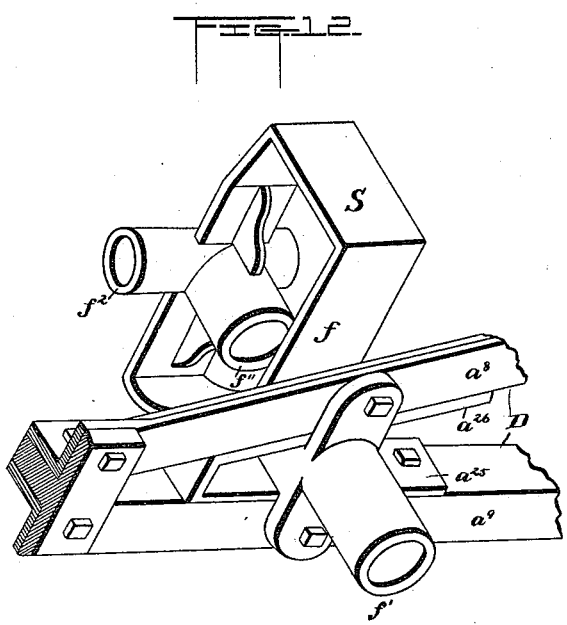

UNITED STATES PATENT OFFICE.

ALBURTICE O. SLENTZ, OF CANTON, OHIO, ASSIGNOR TO THE PEERLESS REAPER COMPANY, OF SAME PLACE.

HARVESTER.

SPECIFICATION forming part of Letters Patent No. 441,038, dated November 18, 1890.

Application filed December 12, 1887. Serial No. 257,641. (No model.)

*To all whom it may concern:*

Be it known that I, ALBURTICE O. SLENTZ, a citizen of the United States, and a resident of Canton, county of Stark, State of Ohio, have invented a new and useful Improvement in Harvesters, of which the following is a full, clear, and exact description, reference being had to the accompanying drawings, making part of this specification.

My invention relates to improvements in grain-harvesters; and it consists in certain features of construction and combinations of parts, as will be hereinafter described, and set forth in the claims.

Figure 1:
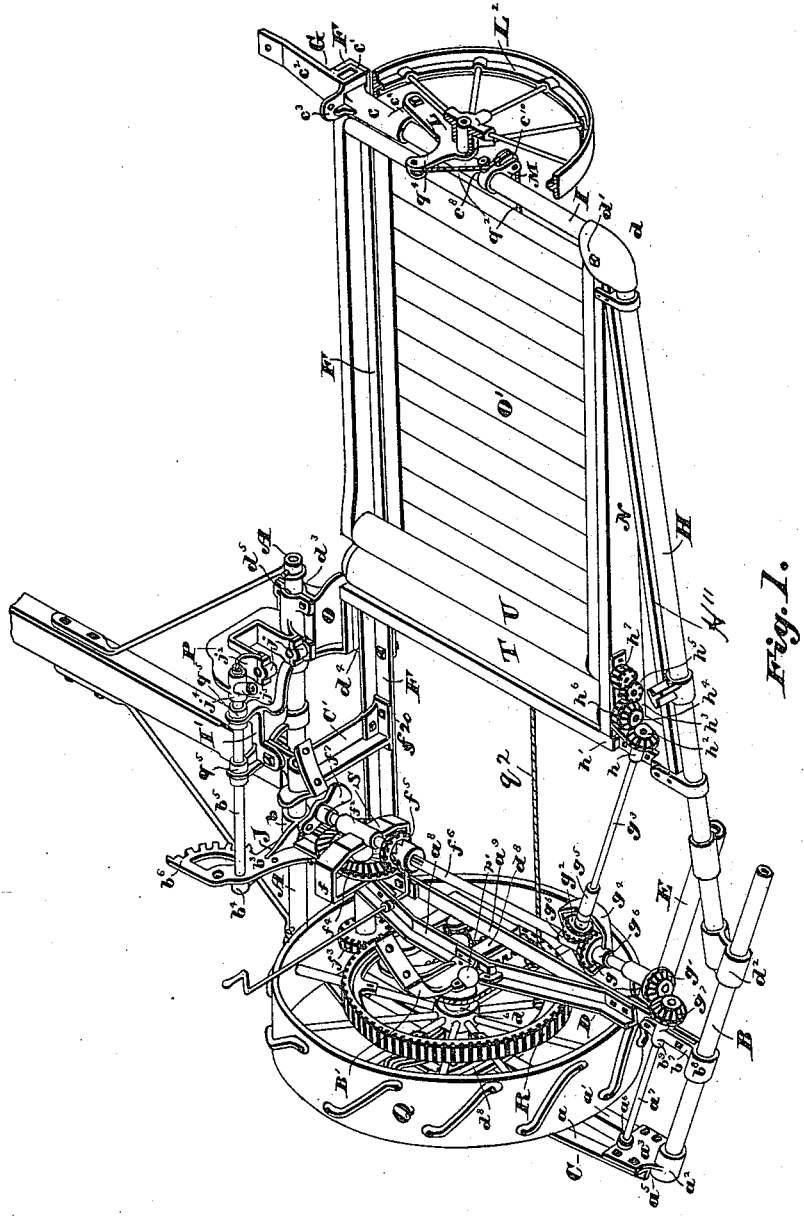
Figure 2:
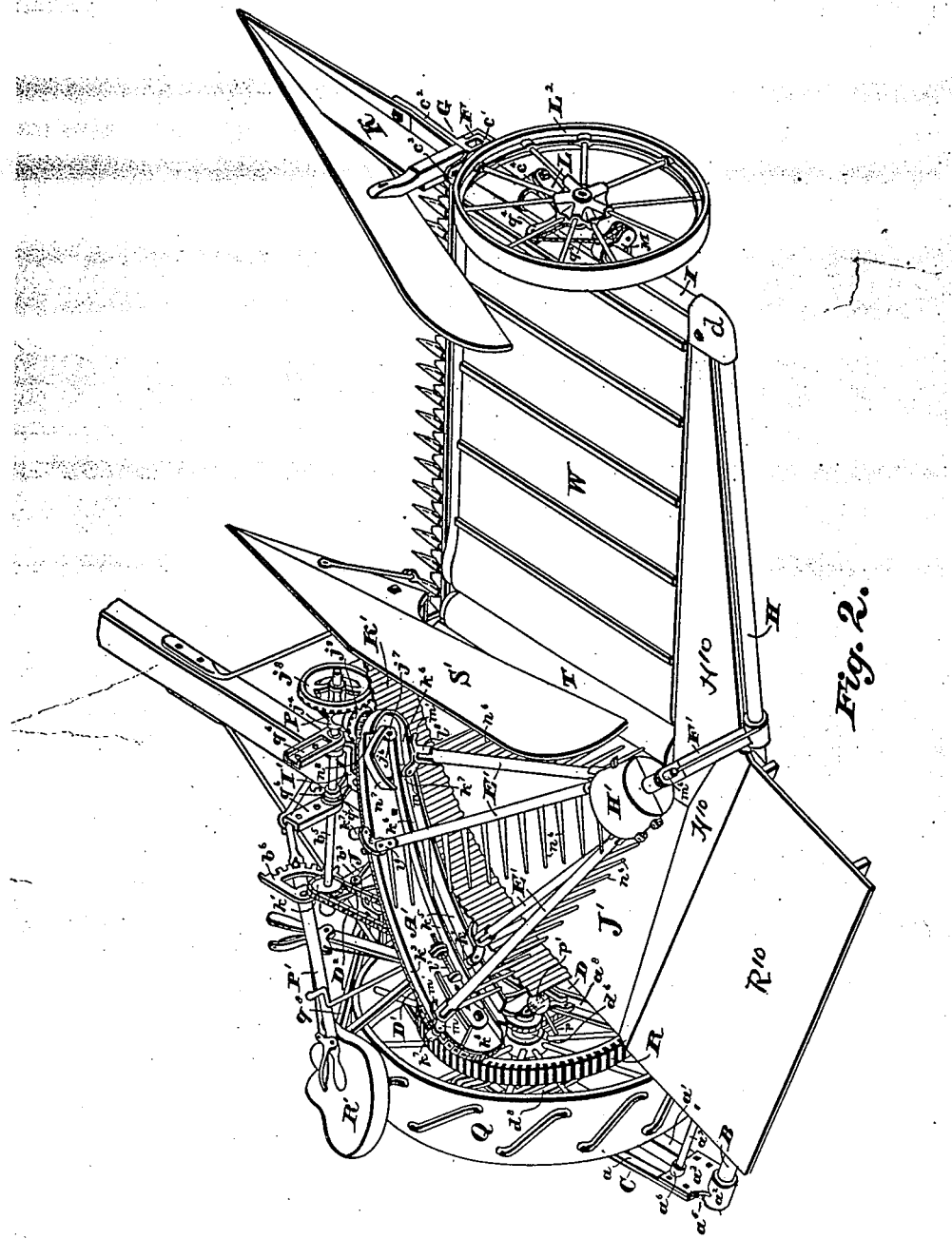
Figure 3:
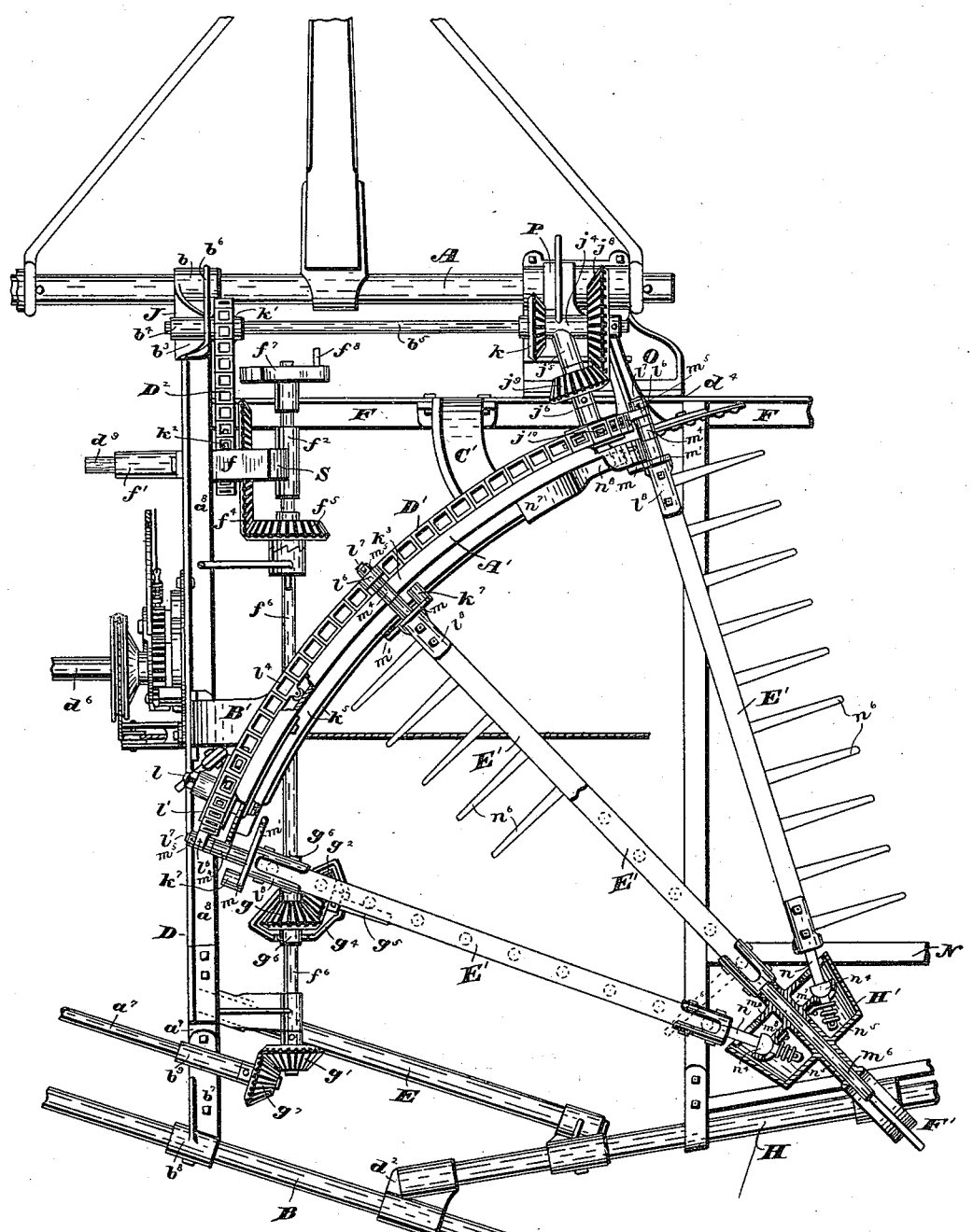
Figure 8:
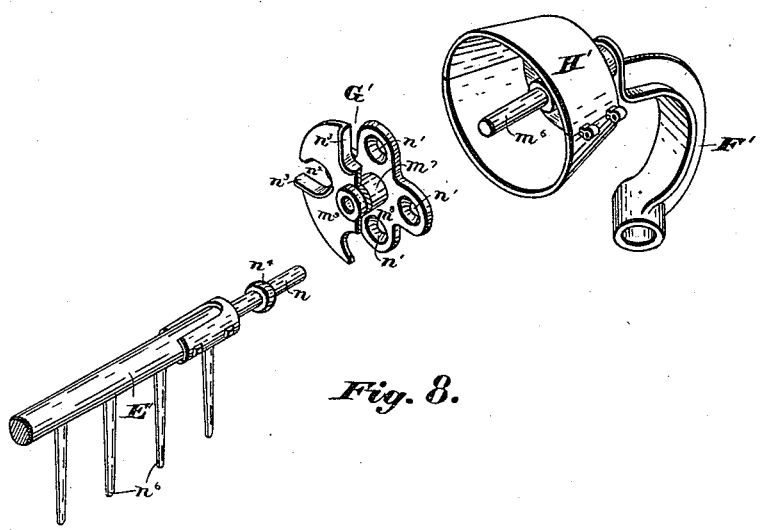
Figure 9:
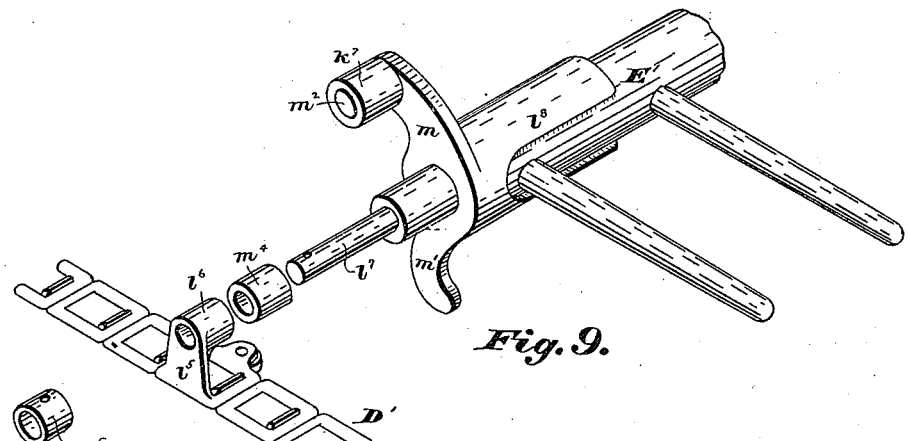
Figure 10:
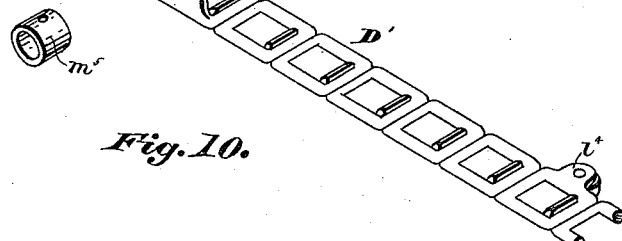

Figure 1 is an isometrical view from right of rear, showing the harvester and gear supporting frames with supporting and gear wheels in position and with platform-canvas, grain-rakes, and butter removed. Fig. 2 is same view, showing the platform-canvas, grain-rakes, and butter in position. Fig. 3 is a plan view of a fragment of the frame enlarged, showing detail of parts and the rake-operating mechanism. Fig. 4 is an isometrical view comprising a fragment of the frame, the butter, and mechanism for operating same. Fig. 5 is an elevation of the rake support and guide from the grain side. Fig. 6 is an elevation of the rake support and guide from the stubble side, showing the chain-grooves and rake-guide. Fig. 7 is a view in perspective of the front end of the rake support and guide, showing the guideways for the chain and rakes. Fig. 8 is an isometrical view comprising a portion of a rake, its supporting-spindle, rotating head, and supporting-stand and spindle. Fig. 9 is an isometrical view comprising a portion of a rake, its supporting spindle and roller, and the head by which the rotary movements are controlled. Fig. 10 is an isometrical view of the rake-driving chain, showing link and guide-wheel and link and journal-box for the rake-spindle. Fig. 11 is an isometrical view of a fragment of the grain end of the harvester-platform frame and grain-wheel arm. Fig. 12 is an enlarged view of parts hereinafter described.

Similar letters of reference indicate corresponding parts in all the figures of the accompanying drawings.

The harvester-frame may be made of any suitable material, preferably light metal bars or pipe; but for the purpose of this application I will describe a frame composed of angle-bars and cylindrical pipe having such forms and combination of parts as I have found practical and economical, and would not limit myself to these particularly-described forms of bars or pipe, as other forms may be substituted.

The stubble or gear supporting end of the frame is composed of the front pipe-sill A and rear pipe-sill B, the truss-girders C and D, and brace E, and the platform-frame of the angle-iron finger-bar F, which extends from the front end of the girder D to the shoe G, and the rear pipe-sill H and pipe-girder I.

The end girder C is formed of the truss-beam $a$ and the straining-beam $a'$, lying under and in the same vertical plane as the beam $a$, and which are connected at their front ends to a corner clip or bracket, (see Fig. 4,) having a cylindrical body portion $a^2$ and a vertical flange $a^3$, projected rearward at right angles from said body, said flange having a laterally-projected flange $a^4$, forming angles adapted to the angle of the beams $a$ and $a'$. The rear ends of said beams are connected to a corner-supporting clip or bracket $a^5$, which is similar to that described and used at the front end of the truss, differing only in this that the cylindrical portion $a^2$ is placed on a line oblique to the vertical flange $a^3$ and the provision of a journal-box $a^6$ (see Figs. 1 and 2) for the binder-actuating shaft $a^7$. The bore of the cylindrical body portions $a^2$ of these corner clips or brackets is adapted to the circumference of the sills A and B, and the sills are secured therein.

The inside girder D is formed of truss-beam $a^8$ and straining-beam $a^9$, their front ends connected to a supporting-bracket J, said bracket having a cylindrical body portion $b$, the bore of which is adapted to the circumference of the sill A, and having, also, a vertical flange $b'$, a horizontal flange $b^2$, forming angles adapted to the truss-beams, and an upwardly-projected standard $b^3$, having at its upper portion a journal-box $b^4$ for the rake and reel actuating shaft $b^5$ and a segmental rack $b^6$, hereinafter explained. The rear end of this girder is connected to and supported by a coupler having a body portion $b^7$, to which the truss is secured, and a cylindrical portion $b^8$, the bore of which is adapted to the circumference of the sill B and in which the said sill is secured. On the front portion of said coupler and integral therewith is provided a journal-box $b^9$ for the inner end of the binder-actuating shaft $a^7$. The cylinder portion of the coupler is placed slightly oblique in line with the cylindrical portion of bracket $a^5$, adapting it to the obliquity of the rear sill B.

The grain-shoe G is of peculiar construction, having a rearwardly-extending cylindrical body portion $c$, having a bore in which the front end of the girder I is secured, a quadrangular laterally-extending portion $c'$, to which the outer end of the angle-iron finger-bar F is secured, a forwardly-projected nose-piece $c^2$, and a vertical lug $c^3$, the last two being the supports of the grain-divider K, bolted thereto. (See Fig. 2.) There is also provided at the rear of the cylindrical part of said shoe a downwardly-projected portion $c^4$, having bearing $c^5$, in which the axial pin $c^6$ of the grain-wheel arm L is loosely mounted, and in which it may be turned, as hereinafter explained.

A sheave-support M is provided, having a body portion $c^6$, adapted to embrace the end girder I, and is secured thereto by a through-bolt $c^7$, on which there is loosely mounted a small sheave wheel or roller $c^8$ and a downwardly-projected frame $c^9$, in which the sheave $c^{10}$ is supported.

The girder I and sill H are connected by an elbow-coupling $d$, having upper and lower inwardly-projected flanges $d'$, between which the corner of the platform-frame N is secured, the sill H projecting laterally toward the stubble end of the machine and inclining backward on a line slightly oblique to the finger-bar F to a point at which it is connected to oblique sill B by the coupler $d^2$, as shown in Figs. 1 and 3.

The brace E, extending from the girder D to sill H and connected in any suitable manner, is provided to bridge the point of connection between the sills B and H and to brace the stubble end of the platform. The grain end of the front sill A and the finger-bar F are secured together by the shoe O, the front upper portion of said shoe having a transverse groove $d^3$, semicircular in cross-section, adapted to the circumference of the sill A, and the lower portion of the shoe having an angular seat $d^4$, adapted to the angle of the bar F, to which it is secured. The base of a journal-frame P is provided with a groove $d^5$, semicircular in cross-section, adapted to the circumference of the sill A. The grooves $d^3$ and $d^5$ embrace the sill, and may be secured by bolts, substantially as shown in Figs. 1 and 3, thus completing the platform and gear supporting frame.

The main drive-wheel Q, carrying gear-wheel R, is loosely mounted on and rotated about the axle $d^6$, on the ends of which there are secured the usual pinions, which engage with similar cogs in the segmental racks $d^8$, said racks having a bolted connection with the truss-beams $a$ and the straining-beam $a'$, and also to beams $a^8$ and $a^9$. A rectangular frame $s$ is provided to support the counter-shaft $d^9$ and crank-shaft $f^6$, said frame having a yoke-like body portion $f$ and journal-boxes $f'$ $f''$ for the counter-shaft and $f^2$ for crank-shaft $f^6$, the said frame being secured to the trusses $a^9$ and $a^8$ by oppositely-extending flanges $a^{25}$ and $a^{26}$. On the outer end of the counter-shaft $d^9$ is mounted pinion $f^3$, the cogs of which engage with similar cogs on wheel R, and near the inner end the shaft has a bevel-wheel $f^4$, (the end of the shaft resting in journal-box $f''$,) the cogs of said wheel engaging similar cogs on the wheel $f^5$, mounted on crank-shaft $f^6$, which is supported in journal-box $f^2$. On the front end of said crank-shaft is mounted a crank-wheel $f^7$, carrying the knife-driving wrist-pin $f^8$. There is also provided and mounted on the said shaft $f^6$ near its rear end bevel-pinions $g$ and $g'$, the cogs of wheel $g$ engaging similar cogs on a wheel $g^2$, mounted on the stubble end of the shaft $g^3$. The stubble end of said shaft is supported by a gear-shielding frame $g^4$, as shown, and is journaled in the journal-box $g^5$, said frame being supported on crank-shaft $f^6$ by the journal-boxes $g^6$, located on each side of the pinion $g$, which is secured to the crank-shaft $f^3$, thus securing the frame $g^4$ in its proper relation. The wheel $g'$, mounted on the rear end of said shaft $f^6$, engages with a similar wheel $g^7$ on the binder-actuating shaft $a^7$. The grain end of shaft $g^3$ is supported in a journal-box $h$, resting on girder $h'$, extending across the machine and secured to the frame thereof in any suitable manger, and on that end of said shaft is mounted a bevel-wheel $h^2$, engaging a similar part $h^3$ of an integral spur and bevel wheel $h^6$ on the rear end of shaft $h^4$ of grain-clearing roller T, journaled at the left-hand side of the grain-deck O'. An intermediate wheel $h^5$ is provided, by which a geared connection is made between the wheels $h^6$ and $h^7$, the said wheel $h^7$ being mounted on the rear end of the shaft that carries and rotates the canvas-roller U, the front end of the roller-shafts resting in and being supported by the frame N. By this arrangement of gears the two rollers move in the same direction.

The journal-frame P is of the form substantially as shown in Fig. 1, consisting of a base adapted to be secured to the shoe O, as hereinbefore described, vertical journal-boxes $j$ for the crank-shaft $j'$, arranged above said base, and a recess $j^2$, above the upper box $j$, and in which is situated the pinion $j^3$, by which the aforesaid cranked shaft is rotated. On the top of said frame P there is provided a horizontal journal-box $j^4$, in which is supported and rotated the reel-driving shaft $b^5$, hereinbefore mentioned, and another horizontal journal-box $j^5$, projected backward and slightly toward the grain side, adapted to support the front end of the rake-actuating shaft $j^6$, the rear end of said shaft rotating in a journal-box $j^7$, provided on the front end of the rake-track A', or, if preferred, the pinion $j^9$ may be integral with sprocket-wheel $j^{10}$ and the shaft $j^6$, pinned into the journal-boxes, allowing the wheels to rotate about the shaft. On the grain end of this reel-driving shaft $b^5$ is mounted a bevel-wheel $j^8$, having teeth adapted to engage similar teeth on the pinion $j^9$ on shaft $j^6$, and on said shaft $b^5$ at the stubble end of the journal-box $j^4$ there is mounted a bevel-wheel $k$, having cogs adapted to engage similar cogs on the pinion $j^3$. (Shown in Fig. 4.) On the stubble end of shaft $b^5$ there is mounted a sprocket-wheel $k'$, and on the counter-shaft $d^9$ a similar wheel $k^2$, which sprocket-wheels correspond and are encircled by a sprocket-chain $D^2$, by which motion is communicated from the counter-shaft $d^9$ to shaft $b^5$.

As a support for the rake-track A', standard B' is provided, the base being bolted to the truss D at its intermediate portion, and standard C' is provided, the base of which is bolted to the finger-bar F, as shown at $f^{20}$, Fig. 1; or, if preferred, these standards may be secured to other parts of the frame. The rake-track A' is secured to the upper portion of the said standards, as shown in Fig. 3—that is, so suspended that the outer edges are free from contact with other parts of the frame to allow the rakes to revolve about the tracks, as hereinafter explained.

On the front side of the track A' there are provided ribs $k^3$, forming grooves $k^4$ to guide and protect the rake-driving chain D', and on the rear side of the track ribs $k^5$ are provided, forming a groove or track $k^6$ for the rake-head roller $k^7$. At the rear end of the track A' there is provided an adjustable portion $k^8$, having a perforation $k^9$, into which is secured a spindle $l$, upon which the sprocket-wheel $l'$ is journaled. Said adjustable portion is also provided with slots $l^2$, into which bolts, as shown, on the fixed portion project, by which the parts may be held together, and a screw $l^3$, having one of its ends loosely secured to the adjustable portion and the other to the fixed portion, by which the parts may be adjusted to lengthen or shorten the track A'.

The rake-driving sprocket-chain D' has at intervals along its length roller-supporting links $l^4$ and other links $l^5$, (see Fig. 9,) supporting a roller similar to those carried by links $l^4$, and a journal-box $l^6$ for the rake-spindle $l^7$. This chain is placed about the sprocket-wheels $j^{10}$ and $l'$ and runs in the groove $k^4$, and is made taut by extending the adjustable portion $k^8$ of the rake-track. The roller-supporting links $l^4$ are at such intervals as will suffice to carry the chain free from the arc of the rake-track A', and the rake-journal-supporting links $l^5$ serve to carry the rake-head E', of the usual construction, about the track, the spindles $l^7$ being supported by and rotating in the journal-boxes $l^6$. The spindle $l^7$ is or may be integral with the socket $l^8$, in which the rake-head E' is secured, and which is provided with arms $m$ and $m'$, projecting at right angles to said spindle and in opposite directions, the arm $m$ having a roller-pin $m^2$, on which the roller $k^7$ is loosely mounted and on which it may rotate. The roller $m^4$ is journaled on the spindle $l^7$ between the socket and the journal-box $l^6$ to facilitate the travel of the rake over the top of the track, as shown. $m^5$ is a collar pinned on the end of the spindle to hold the parts in working position.

A standard F' is provided, secured to the rear pipe-sill H, to support the grain or rear end of the rakes E'. In this case its base is cylindrical, and the bore is adapted to the circumference of the sill H, but may be of any required form. The body portion of the standard is curved backward and upward to provide room for the cut grain to pass. At the top of the standard there is a horizontal spindle $m^6$, about which the head G' is rotated. The said head is formed of a hub $m^7$ and disks $m^8$ and $m^9$. The disk $m^8$ is to support the spindles $n$ of the rakes E', and is provided with perforations $n'$, spherically countersunk on the front side. The disk $m^9$ has radial slots $n^2$, through which the rake-spindles $n$ pass, which, resting against the edges $n^3$ of the slots $n^2$, are thereby permitted to rotate about the spindle $m^6$.

On the rear end of each rake-spindle there is provided a spherically-formed collar $n^4$, adapted to fit the countersunk perforations $n'$. About the end of the spindle $n$ there is placed a coil-spring $n^5$, one end of which is attached to the disk $m^8$ and the other to the end of the spindle. The energy of this spring is exerted to hold the spherical collar $n^4$ into the aperture $n'$. The arm $m'$ on the rake-head socket $l^8$ will engage the cam $n^7$, located on the rear side of the rake-track A' at its forward end above the upper rib $k^5$ and projecting laterally beyond said rib, by which the roller $k^7$ on the arm $m$ will be turned into the open end $n^8$ of groove $k^6$, by which the rake-head will be rocked and the teeth will be turned down and held in a vertical position while passing over the platform J'.

A covering H', of the form substantially as shown, is provided to protect the rear ends of the rake-heads from violence.

The rakes are revolved about the track A' by the chain D', driven by the sprocket-wheel $j^{10}$, which is driven by the power and movement transmitted from the gear-wheel R, pinion $f^3$, shaft $d^9$, sprockets $k^2$ and $k'$, chain $D^2$, shaft $b^5$, wheel $j^8$, and pinion $j^9$, as shown in Fig. 3, and as the rakes pass down at the front end of the track the teeth are brought to a vertical position, in which position they sweep the platform J', and in rising up and over the rear end they assume a horizontal position, as shown in Fig. 3, and so pass over the track to the forward end.

The grain-butter K' may be made of any suitable material, preferably of corrugated steel-plate. It is in segmental form, and is supported at its rear end on a slide-rod $p$, engaged with a ball-socket $p'$, secured to the truss $a^8$. The other end of the butter is bolted to an arm $j^{15}$, which is pivoted upon the crank $j'$, which is rotated by the pinion $j^3$, thereby imparting a longitudinally-reciprocating movement to the said butter. The platform J' is suitably secured to the main frame at the left-hand side of the grain-deck O', and to the rear of this platform and of the ground-wheel Q is secured to the binder-table $R^{10}$. It will be noticed that the platform J' and grain-butter form a curved way for the grain for the purpose of guiding it from the grain-deck to the binder-table. Planks $H^{10}$ (shown in Fig. 2) are secured upon beams $H^{11}$ (shown in Fig. 1) for the purpose of filling up the spaces formed between the grain-deck, platform, and binder-table. A cable $q^2$ extends under the platform and connects to certain winding and unwinding devices, which form no part of this invention.

To rock the harvester on the main and grain wheels for the purpose of raising or lowering the cutters, a hand-lever P' is provided, pivoted to segmental rack $b^6$ and provided with a spring-actuated locking-bolt adapted to the teeth of said rack and operated by a handle, latch, and cord connection in the usual way of operating such bolts, the lower end of the lever having a link-connection $l^5$ with the tongue, which has a pivotal or hinged connection with the harvester-frame. By raising or lowering the hand-lever the harvester-cutters may be adjusted to the crop and fixed in said adjustment by the locking-bolt on the lever catching into the segment.

A reel-supporting bracket I' (see Fig. 1) is provided, and is supported by the sill A and a bolt-connection with the standard $c'$, the upper end of said bracket having sleeves $q^5$, embracing the reel-driving shaft $b^5$. Upon these sleeves the lower ends of the reel-supporting arms $q^6$ are hinged, as shown in Fig. 2.

The supporting-frame for the driver's seat is formed substantially as shown in Fig. 4, consisting of a foot-rest $q^7$ and a bar $q^8$, extending upward and back therefrom to standards $q^9$, secured to the girders C and D. The seat R' is mounted on a projection of the bar $q^8$ in rear of the standards.

The inside divider-board S' is supported by the shoe O, secured thereto in any suitable manner, and is extended rearwardly some distance above the path of the grain, as shown in Fig. 2, to prevent the incoming grain falling on the rakes.

The operation of the harvester is as follows: As the machine is advanced, the several parts are put into operation. The cut grain, falling on the platform-canvas W, is carried to roller T, by which it is thrown onto platform J', at which point the action of the butter will even the butt-ends of the straw preparatory to forming a sheaf, when it is caught by rotary reciprocating rakes and swept back onto the sheaf-receptacle, where it may be bound, and from which it may be discharged in the rear of the machine by a binding and discharging mechanism that will be the subject of a future application.

Having thus fully described the nature and object of my invention, what I claim, and desire to secure by Letters Patent, is—

1. The stubble or gear supporting end of the frame, consisting, essentially, of the front sill, the rear sill, the two girders connecting the sills, the front sill of the grain-platform, the rear sill of the grain-platform connecting with the rear sill of said frame at an angle, the girder at the grain end of the platform, the girder at the stubble end of the platform, and the brace connecting the rear sill of the platform with the inside truss-girder, substantially as set forth.

2. In combination, a supporting-bracket J, consisting, essentially, of a hollow body $b$, rearwardly-projecting portions $b'$ $b^2$, forming a seat, an upwardly-projecting portion $b^3$, provided with bearings, a segmental rack at the upper end of the said upwardly-projecting portion, the front sill embraced by the hollow body portion of said bracket-truss, a girder D, engaged in said seat, a reel-shaft journaled in one of said bearings, and a rocking lever fulcrumed in the other bearing and provided with a bolt to engage said segmental rack, substantially as set forth.

3. In combination, the journal-frame P and the shoe O, each formed at their adjacent surface with a half-sleeve bolted to each other, the shoe O being provided with a seat $d^4$ and the journal-frame P provided with a number of journal-boxes, the front sill A, journaled in the bearing formed by the half-sleeves, the front platform-sill, the stubble end of the finger-bar F, engaged in the seat $d^4$, the reel-shaft, rake-operating shaft, and the butter-operating shaft journaled in the said bearings formed in the journal-frame P, substantially as set forth.

4. The combination of a shoe G, consisting of the hollow body portion, a depending seat at the forward end of said hollow body portion, a forwardly-projecting portion $c^2$, an upwardly-projecting portion $c^3$, and a journal-bearing at the rear end of the hollow body portion, the finger-bar F, engaged in said seat, the end girder in said hollow body portion, a divider bolted to the portions $c^2$ and $c^3$, and a grain-wheel-supporting arm journaled in said bearing, substantially as set forth.

5. In combination, the main drive-wheel having a gear-wheel secured thereto to rotate therewith, a longitudinal shaft, a transverse binder-actuating shaft located at the rear of the main drive-wheel, a transverse countershaft at the front of said wheel, and suitable gear connecting the longitudinal shaft with the transverse shaft at the front and rear of the drive-wheel, substantially as set forth.

6. In combination, a main drive-wheel having a gear-wheel arranged to rotate therewith, a longitudinal shaft, a transverse counter-shaft at the front of the wheel on the stubble side of the longitudinal shaft, a transverse binder-actuating shaft at the rear of the wheel and on the stubble side of the longitudinal shaft, a transverse carrier-operating shaft on the grain side of the longitudinal shaft, and suitable gear connecting the transverse shafts with the longitudinal shaft and the transverse counter-shaft with the gear-wheel, substantially as set forth.

7. In combination, a grain-platform, a binder-platform, a horizontally-curved passage-way for the cut grain between the grain-platform and the binder-platform, the curved side of the curved passage-way being toward the main drive-wheel, and a rake to force the grain along the curved passage-way, the rake being actuated from the end which travels along the convex side of the curved passage-way, substantially as set forth.

8. In combination, a grain-platform, a horizontally-curved passage-way for the cut grain extending from the stubble end of the grain-platform to the rear of the machine, with its convex side toward the main drive-wheel, and a grain-rake having one end of its head pivoted at the concave side of the passage-way and the opposite end of its head attached to suitable actuating mechanism, substantially as set forth.

9. In combination, a grain-platform, a horizontally-curved passage-way for the cut grain extending from the stubble end of the grain-platform to the rear of the machine, with its convex side toward the main drive-wheel, a rotary rake-head bearing located at the concave side of the passage-way, and a rake having one end of its head pivoted in the rake-head bearing and the opposite end attached to a suitable actuating mechanism, substantially as set forth.

10. In combination, a grain-platform, a horizontally-curved passage-way for the cut grain extending from the stubble end of the grain-platform to the rear of the machine, with its convex side toward the main drive-wheel, a rotary rake-head bearing located at the concave side of the passage-way, a rake-head bearing constructed and arranged to travel in a curvilinear path along the convex side of the passage-way, and a rake having the ends of its head secured one in each of said bearings, substantially as set forth.

11. In combination, a curved passage-way for the cut grain, an endless chain mounted on suitable bearings along the convex side of the passage-way, means for driving the chain, and a rake having one end of its head pivoted at the concave side of the passage-way and the opposite end of its head secured to the chain, substantially as set forth.

12. In combination, a curved passage-way for the cut grain, a support for an endless chain located along the convex side of the passage-way and conforming to the curve thereof, grooves along the top and bottom of the support, an endless chain located in the grooves, means for driving the chain, and a rake having one end of its head pivoted at the concave side of the passage-way and the oppposite end of the head secured to the chain, substantially as set forth.

13. In combination, a curved passage-way for the cut grain, a support for an endless chain located along the convex side of the passage-way and conforming to the curve thereof, grooves along the upper and lower portions of the stubble side of the support, an endless chain located in the groove on the stubble face of the support, a rake-head bearing having a loose connection with the chain and having an arm adapted to engage the groove on the grain side of the support, and a rake having one end of its head pivoted at the concave side of the passage-way and the opposite end of its head secured to the said rake-head bearing, substantially as set forth.

14. In a harvester, the combination of the track-support for the rake-actuating mechanism, said support provided on its front face with chain-guides and on its rear face with a guide-groove and an inclined guide-rib $n^7$, the endless chain adapted to travel along the chain-guides on the track-support, and the rake-head loosely secured to the chain and having the arms M and M', the former having a projection, substantially as set forth.

15. In combination, a grain-platform, a horizontally-curved passage-way for the cut grain extending from the stubble end of the grain-platform to the rear of the machine, with its convex side toward the main drive-wheel, a rotary bearing for the rake-heads located at the concave side of the passage-way, a series of rake-heads loosely mounted in the rotary bearing, and a traveling endless chain in connection with the ends of the rake-heads at the convex side of the passage-way, substantially as set forth.

16. In a raking mechanism for harvesters, the combination of a rotary disk provided with countersunk perforations and a series of rake-heads provided with spindles having rounded faced collars adapted to seat in the countersunk portions of said disks, and means for actuating said rake-heads, substantially as set forth.

17. In a raking mechanism for harvesters, the combination of a rotary disk provided with countersunk perforations, a second disk mounted on the same axis with the said rotary disk and having radial slots open to its periphery, and a series of rake-heads passing through the slots in the latter disk and having bearings in the countersunk perforations in the former disk, substantially as set forth.

18. In a raking mechanism for harvesters, the combination of a rotary disk provided with perforations, a series of rake-heads loosely seated in said perforations, springs interposed between the ends of said rake-heads and the said disk, and means for operating the opposite ends of the heads in a curvilinear path and at the same time rotating the heads on their axis, substantially as set forth.

19. In a rake mechanism for harvesters, the combination of a rotary disk provided with perforations, a second disk provided with open slots and mounted on the same axis with the said rotary disk, a series of rake-heads loosely seated in the perforations of the former disk and having bearings in the slots on the latter disk, and a hood covering the ends of the rake-heads seated in the disks and projecting over said disks, substantially as set forth.

20. In combination, a horizontally-curved passage-way for the cut grain and a standard-support for the rake-heads at the concave side of the passage-way, the standard having a U-shaped form open toward the passage-way and provided with an inclosing head carrying a rotary disk, with which the rake-heads are adapted to rotate, substantially as set forth.

In testimony whereof I have hereunto set my hand this 3d day of December, A.D. 1887.

ALBURTICE O. SLENTZ.

Witnesses
W. K. MILLER,
CHAS. R. MILLER.